(12) United States Patent
Egle et al.

(10) Patent No.: US 6,733,133 B2
(45) Date of Patent: May 11, 2004

(54) PROJECTION DEVICE INSIDE A MOTOR VEHICLE

(75) Inventors: Frank Egle, Neu-Ulm (DE); Ralf Hinz, Ulm (DE)

(73) Assignee: DaimlerChrysler AG, Stuttgart (DE)

( * ) Notice: Subject to any disclaimer, the term of this patent is extended or adjusted under 35 U.S.C. 154(b) by 139 days.

(21) Appl. No.: 10/016,698

(22) Filed: Oct. 30, 2001

(65) Prior Publication Data

US 2002/0093625 A1 Jul. 18, 2002

(30) Foreign Application Priority Data

Oct. 31, 2000 (DE) ...................... 200 18 644 U

(51) Int. Cl.⁷ .................. G03B 21/00; G03B 31/00; G03B 21/56; G02B 27/14; B60Q 1/26
(52) U.S. Cl. .................. 353/13; 353/15; 359/443; 359/630; 362/490; 362/493; 362/539
(58) Field of Search .................. 353/13, 15, 17; 359/443, 461, 630; 362/490, 493, 539; 345/7

(56) References Cited

U.S. PATENT DOCUMENTS

| | | | | |
|---|---|---|---|---|
| 4,831,366 A | * | 5/1989 | Iino | 345/7 |
| 4,908,611 A | * | 3/1990 | Iino | 345/7 |
| 5,281,985 A | * | 1/1994 | Chan | 353/13 |
| 5,400,045 A | * | 3/1995 | Aoki | 345/7 |
| 5,547,248 A | | 8/1996 | Marechal | 287/188.17 |
| 5,673,963 A | * | 10/1997 | Pietzsch | 296/190.01 |
| 6,292,305 B1 | * | 9/2001 | Sakuma et al. | 359/649 |

FOREIGN PATENT DOCUMENTS

| | | |
|---|---|---|
| DE | 9407102 | 10/1994 |
| EP | 0626292 | 11/1994 |
| JP | 07154724 | 6/1995 |

\* cited by examiner

*Primary Examiner*—Russell Adams
*Assistant Examiner*—Magda Cruz
(74) *Attorney, Agent, or Firm*—Davidson, Davidson & Kappel, LLC

(57) ABSTRACT

A device for projecting image data in a motor vehicle includes a projection surface secured to a roof inside the vehicle and a projector secured at the rear behind the passengers watching the projection.

5 Claims, 1 Drawing Sheet

PROJECTION DEVICE INSIDE A MOTOR VEHICLE

BACKGROUND INFORMATION

The application concerns a device for projecting image data in a motor vehicle.

In motor vehicles, it is usual to display information to the passengers via display units. It is known from the aircraft, railroad and automobile sectors to integrate monitors for displaying information (for example, television or video image data, or else, screen information of data processing systems) in the backs of the head restraints of the seats located in front of the observer. Because of the maximum possible dimension of the display unit resulting therefrom, it frequently becomes difficult for complex information contents (for is, example, large quantities of text, small details in image data) to be still perceived clearly.

European Patent Document 0 626 292 purports to disclose a seat for passengers in which a screen is foldably mounted at least to one armrest. A projection device which is particularly suitable for use in the automobile is disclosed in document JP 07-154724, in which a projection screen for a background projection is foldably attached to the roof in the passenger compartment of the vehicle.

German Utility Model Patent 9407 102 U1 describes a video system for motorhomes, caravans, training rooms, and buses. In this case, a video system is portably contained in a case or a similar receptacle which can be installed at a holding point at a defined distance from the projection surface. A screen which can be rigid and able to be folded away or else to be flexibly rolled up is used as the projection surface.

SUMMARY OF THE INVENTION

The present invention provides a device for projecting image data in a motor vehicle, wherein the device is composed of a projection surface which is secured to the roof inside the vehicle and of a projector which is secured at the rear behind the passengers watching the projection.

The device according to the present invention for the use for front projection in a motor vehicle, in particular an automobile, is advantageously suitable for use with productivity and entertainment services. Thus, it is conceivable for the projection device to assume the display function of a data processing system. It is also advantageous for the monitor function of video telephones or systems for video entertainment to be carried out via the device according to the present invention.

In an excellent manner, the device according to the present invention is provided with a projection surface (for example, a screen) which is mounted to the roof inside the motor vehicle in a manner that it can be folded or rolled up. In an advantageous refinement of the present invention, the projection device is installed behind the passengers, for example, on the rear shelf. However, it is nonetheless also conceivable for the projection device to be fastened to the roof inside the passenger compartment.

The loudspeaker devices of a multi-media system can be mounted directly to the housing of the projector (projection housing) in an advantageous manner. However, it is also conceivable to use a shared projection housing which contains the image projector and acoustic devices loudspeakers, microphones).

It is particularly beneficial for the projection housing to be attached in a manner that it can be folded away (for example, into the rear shelf) so as to not restrict the passenger's field of vision when not in use.

In an advantageous embodiment of the device according to the present invention, the projection unit (projector, projection housing) is connected to the projection surface in such a manner that both subunits can be jointly swung out or rolled out, respectively.

DETAILED DESCRIPTION

Figure 1:
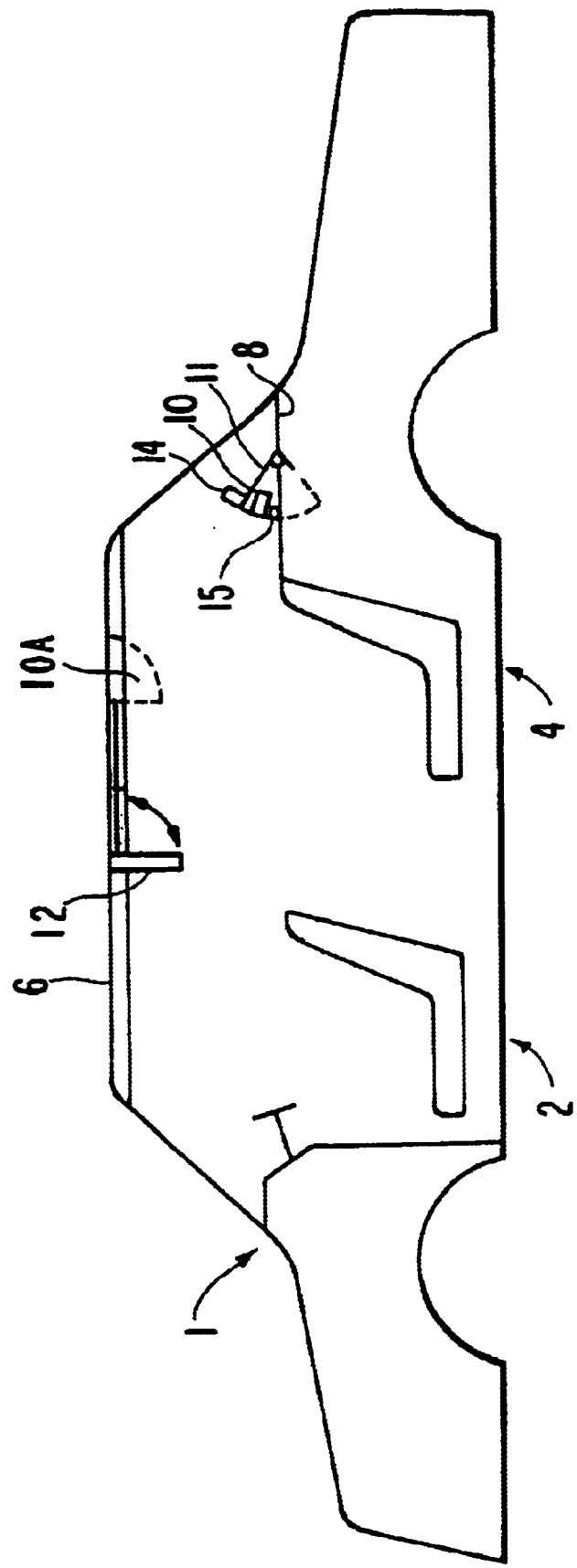
FIG. 1 shows an embodiment of the projection unit of the present invention.

FIG. 1 shows a motor vehicle 1 having a front passenger seat row 2 and a rear passenger seat row 4, with rear shelf 8 and a roof 6. A projector 10, is supported in a rear shelf 8 in a housing 11, and may be folded away when not in use. The projector 10 can project an image onto a screen or projection surface 12. Speakers 14 and acoustic devices15, such as a microphone, may be connected to housing 11. The projection surface 12 can fold against the roof 6. Alternate to projector 10, a projector 10a can be provided that also may retract into the roof. A link can connect projector 10a and surface 12 so that they can be retracted or deployed jointly.

What is claimed is:

1. A device for projecting image data in a motor vehicle comprising:
   a projection surface secured to a roof inside the vehicle; and
   a projector secured in a foldable manner to a rear shelf of the vehicle behind the passengers watching the projection.

2. The device as recited in claim 1 wherein the projection surface is mounted to the roof inside the motor vehicle in a foldable or roll-up manner.

3. The device as recited in claim 1 further comprising loudspeaker devices of a multi-media system mounted directly to a housing of the projector.

4. The device as recited in claim 3 wherein the loudspeaker devices, together with the projector, are integrated in a shared housing.

5. The device as recited in claim 4 wherein the housing further comprising acoustic devices.

* * * * *